(12) United States Patent
Mihira

(10) Patent No.: US 8,730,495 B2
(45) Date of Patent: May 20, 2014

(54) IMAGE PROCESSING SYSTEM

(75) Inventor: Yoshiro Mihira, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1147 days.

(21) Appl. No.: 11/866,904

(22) Filed: Oct. 3, 2007

(65) Prior Publication Data
US 2008/0084577 A1 Apr. 10, 2008

(30) Foreign Application Priority Data

Oct. 4, 2006 (JP) ................................. 2006-273418

(51) Int. Cl.
*G06F 15/00* (2006.01)

(52) U.S. Cl.
USPC ............ 358/1.15; 358/1.14; 358/1.18; 399/8; 709/203; 709/220

(58) Field of Classification Search
USPC ......................................... 358/1.15; 713/150
See application file for complete search history.

(56) References Cited

U.S. PATENT DOCUMENTS

| | | | | |
|---|---|---|---|---|
| 5,029,016 A | * | 7/1991 | Hiyama et al. | 358/403 |
| 6,256,107 B1 | * | 7/2001 | Toda | 358/1.15 |
| 6,437,875 B1 | | 8/2002 | Unno | |
| 6,631,009 B1 | * | 10/2003 | Thomas et al. | 358/1.15 |
| 6,829,059 B1 | * | 12/2004 | Kimura | 358/1.15 |
| 6,907,470 B2 | * | 6/2005 | Sawada et al. | 709/244 |
| 6,980,319 B2 | * | 12/2005 | Ohta | 358/1.18 |
| 7,406,270 B2 | * | 7/2008 | Miyazawa et al. | 399/8 |
| 7,526,212 B2 | * | 4/2009 | Zwiefelhofer | 399/8 |
| 7,584,246 B2 | * | 9/2009 | Yokokura | 709/203 |
| 7,647,345 B2 | * | 1/2010 | Trepess et al. | 707/771 |
| 7,652,781 B2 | * | 1/2010 | Fukui et al. | 358/1.15 |
| 7,952,733 B2 | * | 5/2011 | Oka | 358/1.14 |
| 2005/0128519 A1 | | 6/2005 | Yamauchi | |
| 2005/0166041 A1 | * | 7/2005 | Brown | 713/150 |
| 2006/0274370 A1 | * | 12/2006 | Shima | 358/1.15 |

FOREIGN PATENT DOCUMENTS

| | | |
|---|---|---|
| JP | 2003-087477 A | 3/2003 |
| JP | 2004-236221 A | 8/2004 |
| JP | 2004-258830 A | 9/2004 |
| JP | 2005-170000 A | 6/2005 |
| JP | 2006-060868 A | 3/2006 |

OTHER PUBLICATIONS

U.S. Appl. No. 11/864,083, filed Sep. 28, 2007.

* cited by examiner

*Primary Examiner* — Ashish K Thomas

(74) *Attorney, Agent, or Firm* — Canon USA, Inc., IP Division

(57) ABSTRACT

An image processing system configured to perform image processing with a plurality of apparatuses operating in cooperation with one another includes a setting unit configured to set a cooperation destination apparatus in a cooperation wait state, a searching unit configured to search for the cooperation destination apparatus set to the cooperation wait state by the setting unit, a display unit configured to display a result of the search on a display device, and a control unit configured, using the apparatus included in the displayed search result as the cooperation destination apparatus, to perform image processing with a cooperation source apparatus and the cooperation destination apparatus operating in cooperation with each other.

16 Claims, 18 Drawing Sheets

| ATTRIBUTE | ATTRIBUTE VALUE |
|---|---|
| COOPERATION WAIT SETTING ON? | True |
| COOPERATION WAIT SETTING EFFECTIVE UNTIL ... | 2006/05/16 10:55 |

| | COOPERATION DESTINATION APPARATUS NAME | SERVICE ATTRIBUTE | COOPERATION ACTIVE FLAG | INSTALLATION LOCATION INFORMATION |
|---|---|---|---|---|
| EXAMPLE | DEVICE #1 | PRINT | True | KAWASAKI-1F |

11

110  111  112  113

| ATTRIBUTE | ATTRIBUTE VALUE |
|---|---|
| COOPERATION WAIT SETTING ON? | True |
| COOPERATION WAIT SETTING EFFECTIVE UNTIL ... | 2006/05/16 10:55 |
| PERSONAL IDENTIFICATION NUMBER FOR COOPERATION WAIT SETTING | 1192 |

| ATTRIBUTE | ATTRIBUTE VALUE |
|---|---|
| COOPERATION WAIT SETTING ON? | True |
| COOPERATION WAIT SETTING EFFECTIVE UNTIL ... | 2006/05/16 10:55 |
| PERSONAL IDENTIFICATION NUMBER FOR COOPERATION WAIT SETTING | NULL |
| AUTHENTICATION INFORMATION FOR COOPERATION WAIT SETTING | mihira_yoshiro |

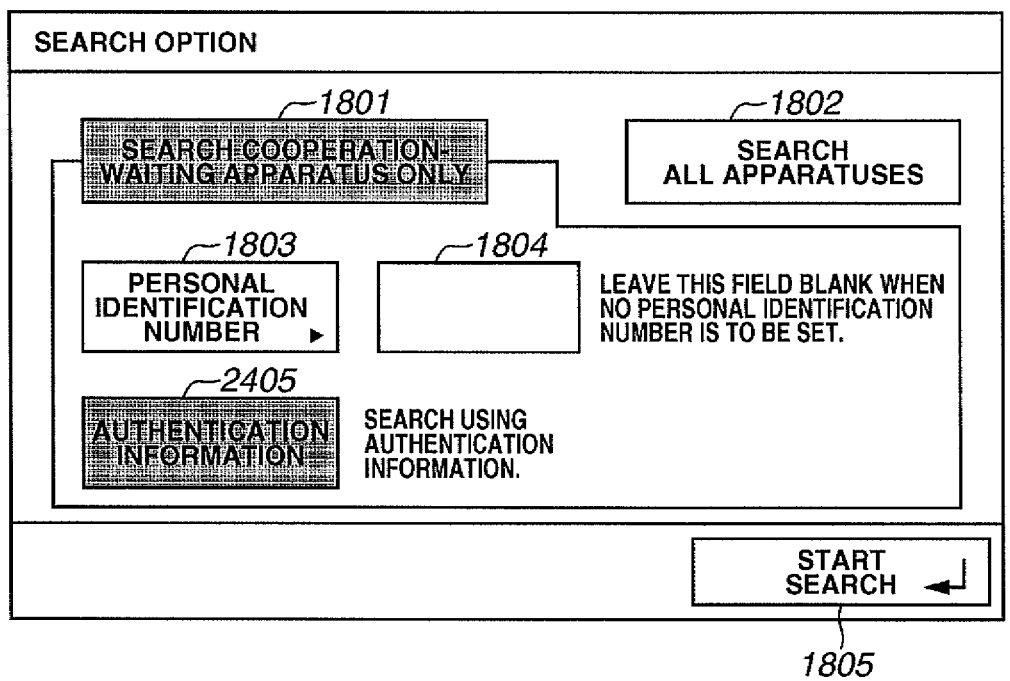

IMAGE PROCESSING SYSTEM

BACKGROUND OF THE INVENTION

1. Field of the Invention

The present invention relates to an image processing system configured to perform a series of processing with a plurality of apparatuses operating in cooperation with one another.

2. Description of the Related Art

In recent years, copying machines have been digitized and thus can communicate with one another via a network. Under such an environment, copying machines on a network are capable of performing one processing in cooperation with one another.

For example, image data of a document is read by a multifunction peripheral (MFP) having functions of a color scanner and a monochromatic printer, the read image data is transferred to a color printer located at a remote place, and the transferred image data can be printed by the remote color printer. Thus, color copying can be implemented.

In the case where a copying machine located close to a user does not have a facsimile transmission function, image data of a document read by the copying machine can be transferred to an apparatus having a facsimile function, which is located at a remote place. Then, the apparatus performs transmission of the transferred image data via a facsimile.

In order to implement such cooperation processing, it is necessary for a user to give an indication about a cooperation destination. When a user indicates a cooperation destination apparatus, the user enters information unique to the apparatus of a cooperation destination. When such information unique to an apparatus is to be indicated, an Internet protocol (IP) address of the apparatus, a device name set to the apparatus, and information about an installation location of the apparatus can be used.

A user can acquire such information unique to a cooperation destination apparatus by various methods.

For example, a user can acquire such unique information by using information about a label attached to the apparatus or by using a user interface (UI) such as a liquid crystal display (LCD) that displays information set to an apparatus.

In order to actually set a cooperation destination apparatus to be associated, it is necessary for a user, for example, to take a note of and memorize information unique to the cooperation destination candidate apparatus. Then, the user designates unique information such as an IP address according to the note and sets the apparatus as a cooperation destination apparatus.

Alternatively, a user can take a note of (memorize) information unique to the cooperation destination candidate apparatus, use a function of searching for a cooperation destination apparatus, cause a cooperation source apparatus to display a list of cooperation destination candidate apparatuses, and then designate a cooperation destination apparatus from among the list of cooperation destination candidate apparatuses in the search result according to the memorized unique information.

However, in the above-described conventional method, when an office or a business place includes a large number of copying machines, a user has to check for unique information about each of the copying machines and perform the above-described operations to designate a cooperation destination apparatus.

As a method for designating a cooperation destination apparatus without using a note of unique information, Japanese Patent Application Laid-Open No. 2005-170000 discusses a method that uses an integrated circuit (IC) card to designate a cooperation destination apparatus. When a cooperation destination apparatus is designated using an IC card, a user can input information about his own personal computer (PC) via a printer (or an MFP having a printer function), through an IC card reader such as a radio frequency identification (RFID).

With the method discussed by Japanese Patent Application Laid-Open No. 2005-170000, when the printer sends to another PC the information entered by the user through the IC card reader, the PC receiving the information automatically activates a printer driver corresponding to the entered information. Here, the information about the user's PC can include an e-mail address or a path name of an open folder of the PC such as "¥¥YPC-2005-01234¥share".

However, in the case where there is large number of copying machines, a user cannot always identify and designate a cooperation destination apparatus using the device or service search because a large number of apparatuses of the same model type exist. In particular, in the case where an individual name of each apparatus is not registered and unique information such as Internet protocol (IP) address of each apparatus is not displayed as a label, a user cannot identify or designate a cooperation destination apparatus.

In such a case, when a user desires to perform cooperative processing using a cooperation destination apparatus located at a place within eyesight, a large number of apparatuses of the same model type are displayed as a search result. Accordingly, it is difficult for the user to select a cooperation destination apparatus from among the large number of apparatuses in the search result. That is, in this case, a user cannot easily identify a cooperation destination apparatus even when the apparatus exists within eyesight.

Furthermore, according to the above-described conventional method, an MFP sends information necessary for activating the printer drive to the user's PC. Accordingly, it is necessary to store an e-mail address or identification information of the PC in an IC card. Thus, an existing IC card cannot be used.

SUMMARY OF THE INVENTION

The present invention is directed to an image processing system and a data processing method capable of easily identifying a cooperation destination apparatus, in the case where a plurality of apparatuses exists as a cooperation destination candidate apparatus.

According to an aspect of the present invention, an image processing system configured to perform image processing with a plurality of apparatuses operating in cooperation with one another includes a setting unit configured to set a cooperation destination apparatus in a cooperation wait state, a searching unit configured to search for the cooperation destination apparatus set to the cooperation wait state, wherein the search is conducted from a cooperation source apparatus, a display unit configured to display a result of the search on a display device, and a control unit configured to, using an apparatus included in the result displayed by the display unit as the cooperation destination apparatus, perform image processing with the cooperation source apparatus and the cooperation destination apparatus operating in cooperation with each other.

According to another aspect of the present invention, a method for an image processing system configured to perform image processing with a plurality of apparatuses operating in cooperation with one another includes setting a cooperation destination apparatus in a cooperation wait state, searching for a cooperation destination apparatus set to the cooperation wait state, displaying a result of the searching, and performing image processing with a cooperation source apparatus and a cooperation destination apparatus found as result of the searching, where the cooperation source apparatus and the cooperation destination apparatus operate in cooperation with each other, wherein the searching is conducted from the cooperation source apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 24 illustrates an example of a UI screen for designating an option for a search performed on a cooperation source MFP according to the third exemplary embodiment of the present invention.

FIG. 25 illustrates an example of a data structure of a search packet according to the third exemplary embodiment of the present invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

Figure 1:
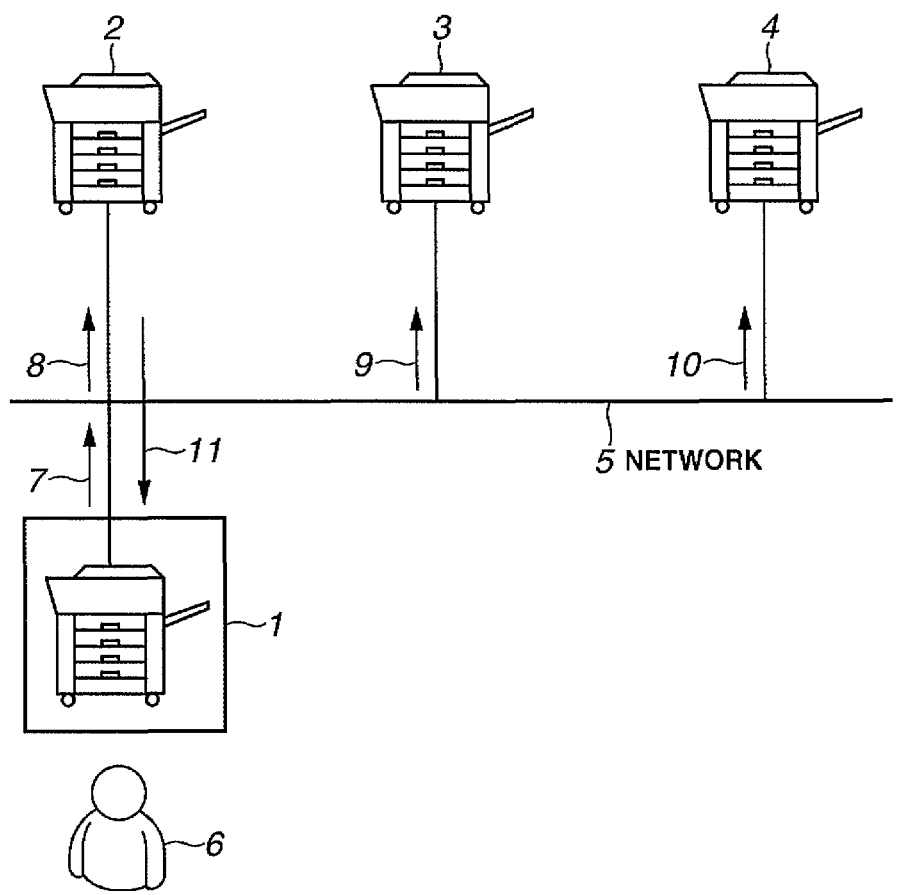
FIG. 1 illustrates an exemplary configuration of a network system according to a first exemplary embodiment of the present invention.

Now, a first exemplary embodiment of the present invention will be described. FIG. 1 illustrates an exemplary configuration of a network system according to a first exemplary embodiment of the present invention.

Referring to FIG. 1, MFPs 1 through 4 are in communication with one another via a network 5. Via the network 5, the MFPs 1 through 4 can be connected to a local area network (LAN) such as Ethernet®.

A user 6 is a user of the system according to the present embodiment. The user 6 operates the MFP 1, which is a cooperation source apparatus, designates and operates another MFP as a cooperation destination apparatus that operates in cooperation with the corporation source MFP.

The user 6 performs a main operation on the cooperation source MFP 1. For example, the user 6 performs scanning and reading of a document with the MFP 1 and prints the read image data with a cooperation destination MFP that is located at a remote place.

The MFPs 2 through 4 are cooperation destination candidate apparatuses. In the present embodiment, the MFP 2, which is a cooperation destination apparatus, serves as a printer. The MFPs 2 through 4 are referred to as "device #1", "device #2", and "device #3", respectively.

Search packets 7 through 10 are sent from the MFP 1 to cooperation destination MFPs via the network 5. The search packet 7 is sent by an IP broadcast method or an IP multicast method. One search packet 7 reaches to each of the MFPs 2 through 4 as a search packet 8, a search packet 9, and a search packet 10, respectively.

A response packet 11 is sent from the MFP 2, which is a cooperation destination MFP, in response to the search packet sent from the MFP 1, which is a cooperation source apparatus.

In the following description, the MFP 1 is used as a cooperation source apparatus and the MFP 2 is used as a cooperation destination apparatus. However, the present embodiment is not limited to this configuration. Furthermore, in the following description, MFPs are connected with one another via the network 5. However, various kinds of apparatuses such as a PC (information processing apparatus), a printer (image forming apparatus), a facsimile apparatus, and a copying apparatus can also be connected to the network 5.

Figure 2:
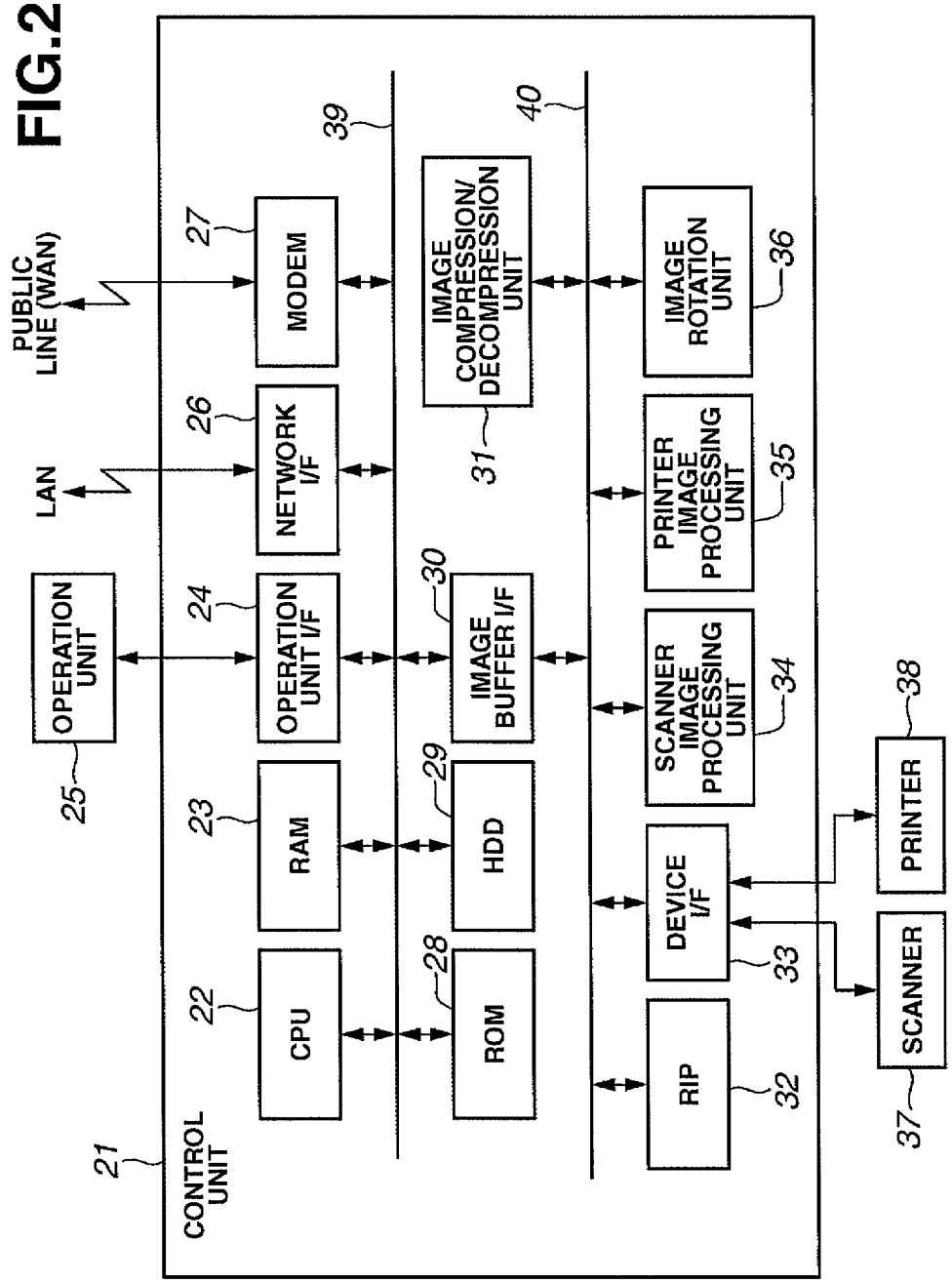
FIG. 2 illustrates an exemplary hardware configuration of an MFP according to the first exemplary embodiment of the present invention.

FIG. 2 illustrates an exemplary hardware configuration of the MFP according to the present embodiment. Each of the MFPs 1 through 4 illustrated in FIG. 1 has the configuration in FIG. 2.

Referring to FIG. 2, a control unit 21 is in communication with a scanner 37 and a printer 38 via a LAN (not illustrated) and a public line (wide area network (WAN)) (not illustrated). Thus, the control unit 21 controls input and output of image data and device information via the LAN and the public line. Here, the scanner 37 is an image input apparatus that reads an image of a document to input the read image data. The printer 38 is an image output apparatus that receives the image data input by the scanner 37 and prints out the received image data.

A central processing unit (CPU) 22 controls the entire control unit 21. A random access memory (RAM) 23 serves as a system work memory for the CPU 22. The RAM 23 also serves as an image memory for temporarily storing image data.

A read-only memory (ROM) 28 is a boot ROM and stores a boot program for the MFP 1. A hard disk drive (HDD) 29 stores an operating system (OS) and a system software application program. When the MFP 1 is activated, the OS and the system software application program stored on the HDD 29 are loaded on the RAM 23 and executed by the CPU 22. In addition, the HDD 29 stores image data input by the scanner 37 and sent via the network 5.

An operation unit interface (I/F) 24 is an interface between the MFP 1 and an operation unit 25 and outputs to the operation unit 25 image data to be displayed on a display unit of the operation unit 25. The operation unit I/F 24 sends information input by a user via the operation unit 25 to the CPU 22. A network I/F 26 is an interface between the MFP 1 and the LAN (not illustrated). The network I/F 26 serves as a communication unit for a data communication between the MFP 1 and other apparatuses in communication with the MFP 1 via the LAN (not illustrated). A modem 27 is connected to the public line (WAN) (not illustrated). The modem 27 serves as a communication unit for a data communication between the MFP 1 and the WAN (not illustrated).

An image buffer I/F 30 is an interface between a system bus 39 and an image bus 40, through which image data is transferred at a high speed. The image buffer I/F 30 is a bus bridge for converting a data structure. The above-described devices and units are in communication with one another via the system bus 39.

A peripheral component interconnect (PCI) bus or Institute of Electrical and Electronic Engineers (IEEE) 1394 can be used as the image bus 40. The following devices are connected to the image bus 40. A raster image processor (RIP) 32 rasterizes a page description language (PDL) code sent via the network into a bitmap image. A device I/F 33 is an interface between the control unit 21 and input/output devices such as the scanner 37 and the printer 38.

A scanner image processing unit 34 performs various processing such as correction, processing, and editing on image data input by the scanner 37. A printer image processing unit 35 performs processing such as image correction and resolution conversion on image data to be printed out by the printer 38, according to a performance of the printer 38. An image rotation unit 36 rotates image data.

An image compression/decompression unit 31 compresses and decompresses multivalued image data according to Joint Photographic Experts Group (JPEG) format. In addition, the image compression/decompression unit 31 compresses and decompresses binary image data according to Joint Bi-level Image Experts Group (JBIG) format, Modified Modified Read (MMR) format, and Modified Huffman (MH) format.

The operation unit 25 displays a message and a UI screen on its display unit such as an LCD. The operation unit 25 sends various information entered by a user via the UI screen to the CPU 22 via the operation unit I/F 24. Thus, a user can perform desired processing for performing various settings or issue an instruction for operating the MFP 1.

Figure 3:
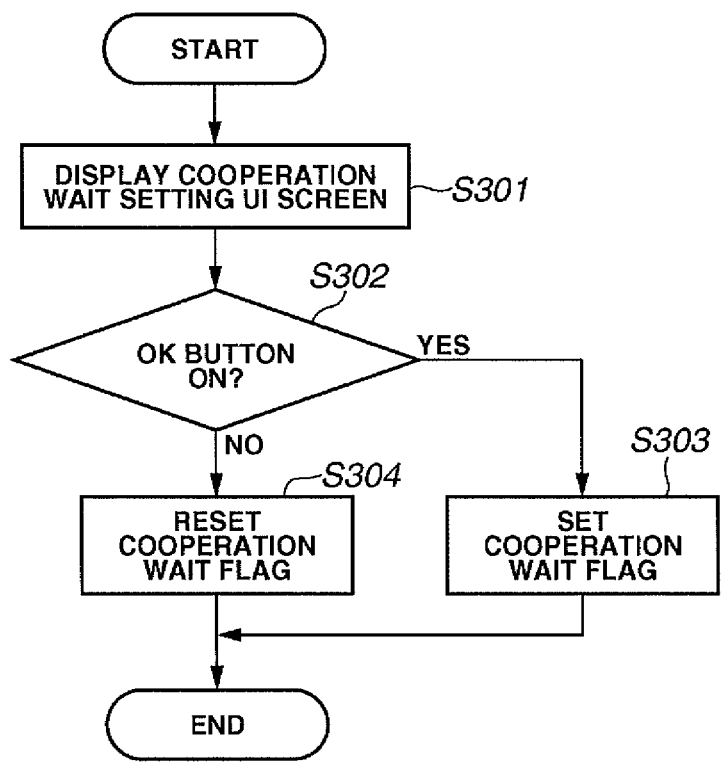
FIG. 3 is a flow chart illustrating exemplary processing for performing a cooperation wait setting on a cooperation destination MFP according to the first exemplary embodiment of the present invention.

FIG. 3 is a flow chart illustrating exemplary processing for performing a cooperation wait setting on the cooperation destination MFP 2 according to the present embodiment.

Referring to FIG. 3, in step S301, the CPU 22 of the MFP 2 displays a UI screen for issuing an instruction for a cooperation wait on the display unit of the operation unit 25. In step S302, the CPU 22 waits until the user sets the cooperation wait via the operation unit 25.

Figure 4:
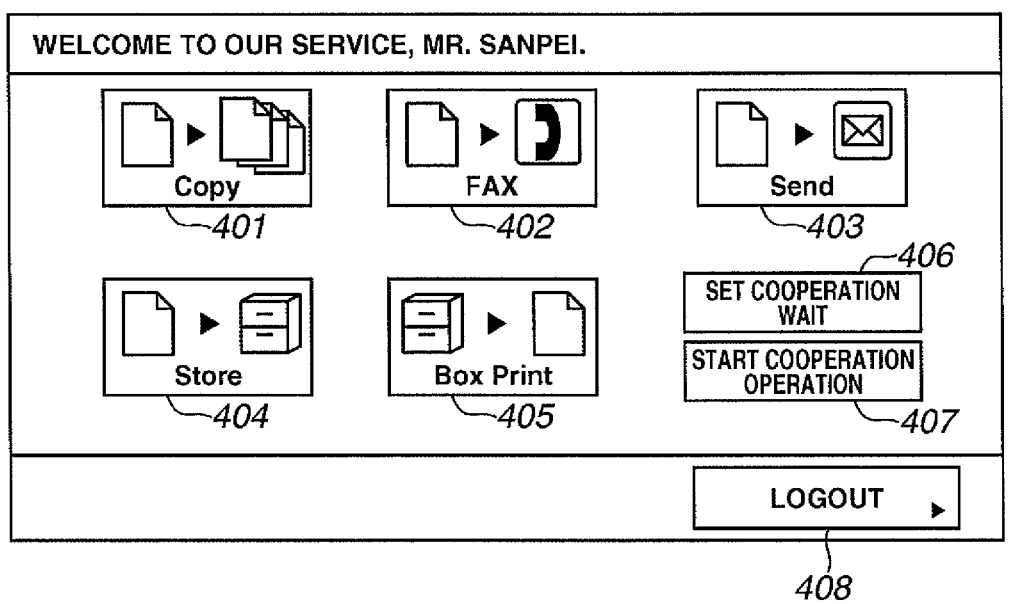
FIG. 4 illustrates an example of a UI screen displayed on an operation unit of the MFP according to the first exemplary embodiment of the present invention.

FIG. 4 illustrates an example of a UI screen displayed on an operation unit 25 of the MFP according to the present embodiment.

Referring to FIG. 4, a copy button 401 is used to issue an instruction for starting a copy operation. A FAX button 402 is used to issue an instruction for starting a facsimile transmission operation. A send button 403 is used to issue an instruction for starting a data transmission operation.

A storage instruction button 404 is used to issue an instruction for storing image data in a box. A box print button 405 is used to issue an instruction for printing the image data stored in a box.

A cooperation wait state instruction button 406 is used to issue an instruction for performing a cooperation wait setting. When the user presses the cooperation wait state instruction button 406 for an apparatus that the user desires to designate as a cooperation destination apparatus, the apparatus waits for cooperation processing. A cooperation operation start button 407 is used to issue an instruction for starting a cooperation operation on a cooperation source MFP. A logout button 408 is used to issue an instruction for logging out from the MFP 1.

Returning to FIG. 3, in step S301, the CPU 22 displays the screen illustrated in FIG. 4 on the operation unit 25. When the user presses the cooperation wait state instruction button 406, the CPU 22 displays a UI screen illustrated in FIG. 5 on the operation unit 25.

Figures 5, 6:
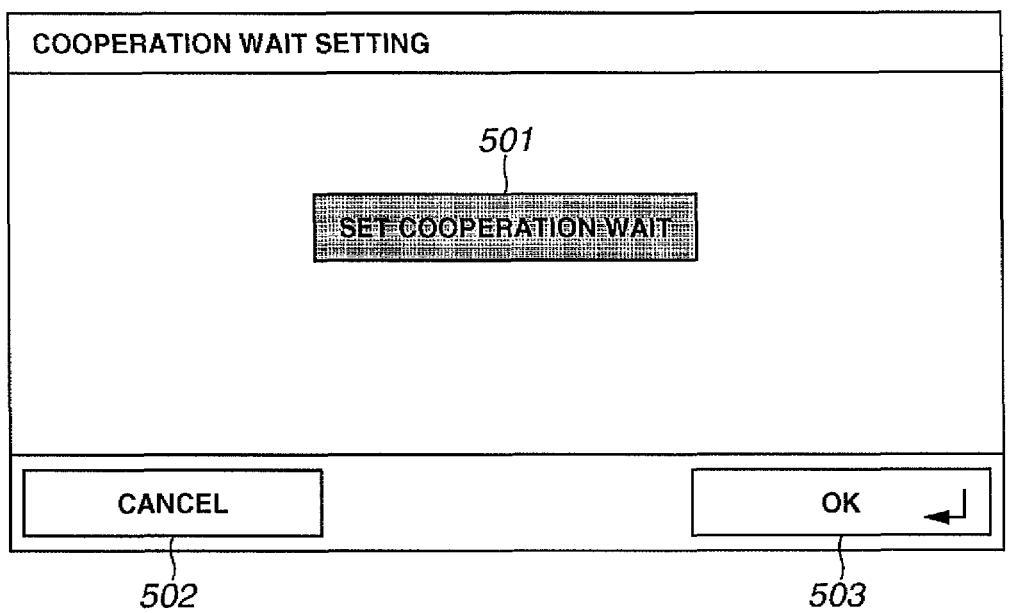
FIG. 5 illustrates an example of a UI screen for performing a cooperation wait setting according to the first exemplary embodiment of the present invention.
FIG. 6 illustrates an example of a cooperation wait flag according to the first exemplary embodiment of the present invention.

FIG. 5 illustrates an example of a UI screen for performing a cooperation wait setting according to the present embodiment. The UI screen in FIG. 5 displays a message 501 for verifying that the user is setting the MFP 1 in a cooperation wait state. In addition, a cancel button 502 for canceling a cooperation wait setting and an OK button 503 for performing a cooperation wait setting are displayed on the UI screen in FIG. 5.

Returning to FIG. 3, in step S302, the CPU 22 of the MFP 2 determines whether the user has pressed the OK button 503. If it is determined in step S302 that the user has pressed the OK button 503 (YES in step S302), then the process advances to step S303. In step S303, the CPU 22 sets a cooperation wait flag on.

On the other hand, if it is determined in step S302 that the user has pressed the cancel button 502 (NO in step S302), then the process advances to step S304. In step S304, the CPU 22 resets the cooperation wait flag. The cooperation wait flag is stored on the HDD 29.

After the user 6 has been successfully authenticated to log in to the MFP 2 and has performed the above-described series of operations on the MFP 2, the user 6 can log out from the MFP 2 by operating the logout button 408.

FIG. 6 illustrates an example of a cooperation wait flag according to the present embodiment.

A cooperation wait flag includes two types of information. One type is cooperation wait setting status information that describes whether a cooperation wait setting is set. The cooperation wait setting status information is stored as "True" (describing that a cooperation wait setting is set) or "False" (describing that a cooperation wait setting is not set). The other type is information about an effective period of the cooperation wait setting. The cooperation wait setting effective period information enables, in the case where a once-performed cooperation wait setting has not been actually executed, automatically canceling of the cooperation wait state after the set effective period has elapsed.

After the user 6 performs a cooperation wait setting as described above, the user 6 moves to the cooperation source MFP 1 and performs the following processing on the cooperation source MFP 1.

Figure 7:
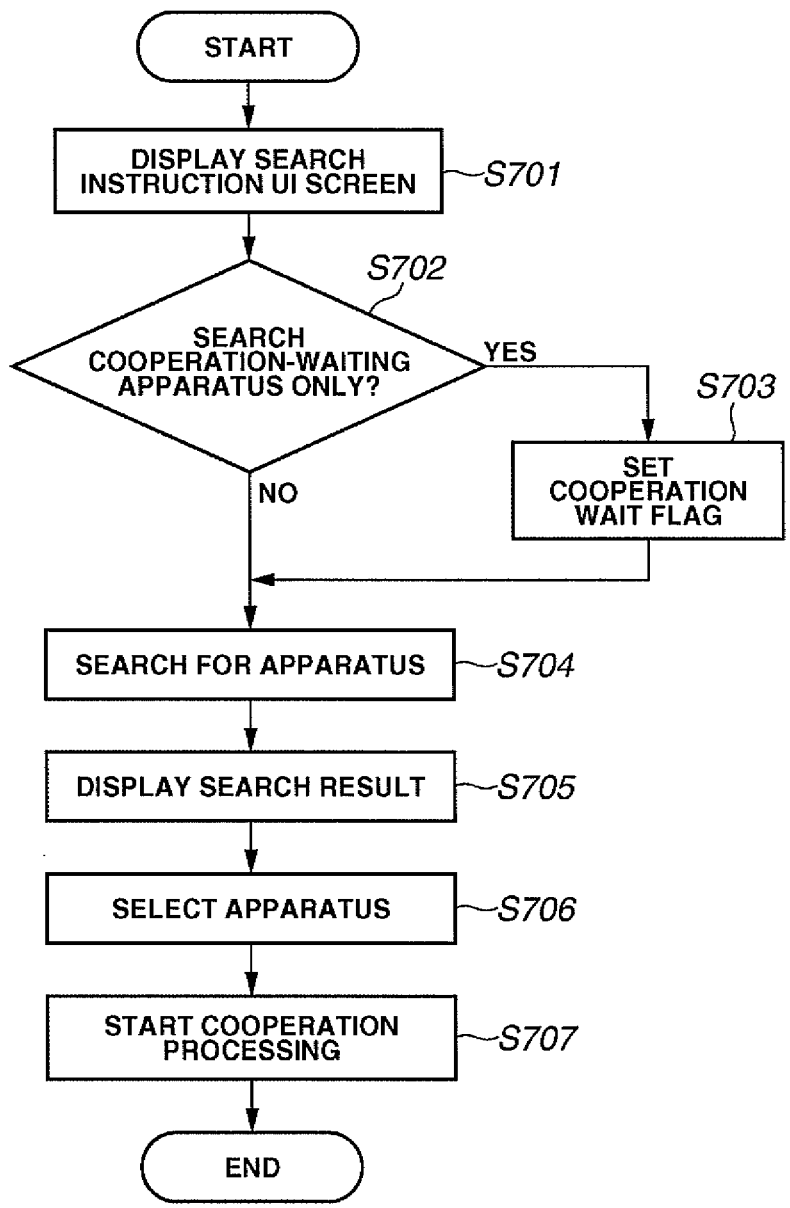
FIG. 7 is a flow chart illustrating exemplary processing performed by a cooperation source MFP according to the first exemplary embodiment of the present invention.

FIG. 7 is a flow chart illustrating exemplary processing performed by the cooperation source MFP 1 according to the present embodiment.

Referring to FIG. 7, in step S701, the CPU 22 of the cooperation source MFP 1 displays the operation (UI) screen illustrated in FIG. 4 on the display unit of the operation unit 25. When the user 6 presses the cooperation operation start button 407, the operation unit 25 displays a UI screen for issuing an instruction for starting a search.

Figure 8:
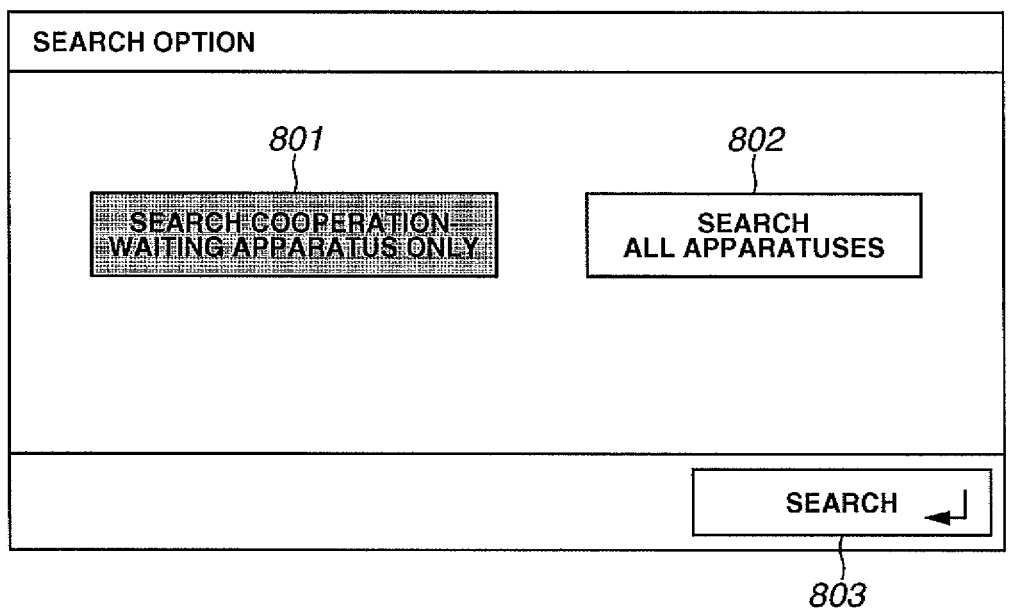
FIG. 8 illustrates an example of a UI screen for issuing a search instruction according to the first exemplary embodiment of the present invention.

FIG. 8 illustrates an example of a UI screen for issuing a search instruction according to the present embodiment.

Referring to FIG. 8, a button 801 is used to issue an instruction to search for only an apparatus in a cooperation wait state. A button 802 is used to issue an instruction to search for all apparatuses connected. A button 803 is used to issue an instruction for starting a search.

Returning to FIG. 7, in step S702, the CPU 22 determines whether the user 6 has pressed the button 801. That is, the CPU 22 determines whether to search for only an apparatus in a cooperation wait state.

If it is determined in step S702 that the user has pressed the button 801 (YES in step S702), then the CPU 22 advances to step S703. In step S703, the CPU 22 sets a cooperation wait flag 903 (FIG. 9) for data of a search packet.

On the other hand, if it is determined in step S702 that the user has pressed the button 802 (NO in step S702), then the CPU 22 does not set the cooperation wait flag 903. The cooperation wait flag 903 is not set because, in this case, the process advances to step S704 to search for all the apparatuses on the network 5 regardless of whether an apparatus is in a cooperation wait state.

Figure 9:
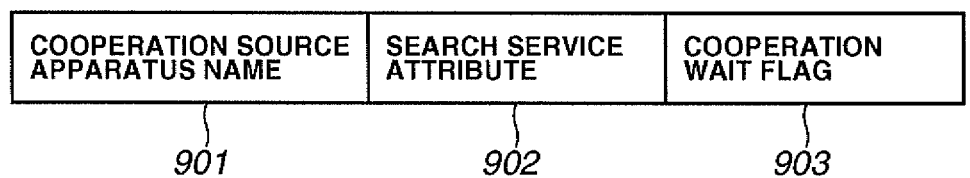
FIG. 9 illustrates an example of a data structure of a search packet used for a search according to the first exemplary embodiment of the present invention.

FIG. 9 illustrates an example of a data structure of a search packet used for the search according to the present embodiment.

Referring to FIG. 9, the search packet data includes three portions 901 through 903.

The cooperation source apparatus name 901 describes device information of a cooperation source apparatus that receives a search result. Here, the cooperation source apparatus name 901 is information about the cooperation source MFP 1.

Search service attribute 902 is used in the case where the user 6 designates a service that the user 6 desires to use before starting a search.

The cooperation wait flag 903 is set in the case of a search for only an apparatus in a cooperation wait state. As described above, the cooperation wait flag 903 is set in step S703 in the flow chart of FIG. 7.

The search packet data is sent from the cooperation source MFP 1 via the network 5 by an IP broadcast method or by an IP multicast method, as described above.

The data structure illustrated in FIG. 9 describes a data structure in an application layer. An actual search packet in a network layer includes source (i.e., sender) information and destination information (broadcast address).

Returning to FIG. 7, in step S704, the cooperation source MFP 1 searches for a cooperation destination apparatus. More specifically, the cooperation source MFP 1 sends the search packet 7 via the network 5 by an IP broadcast method. Thus, the search packets 8 through 10 are sent to each of the MFPs connected to the network 5.

Figure 10:
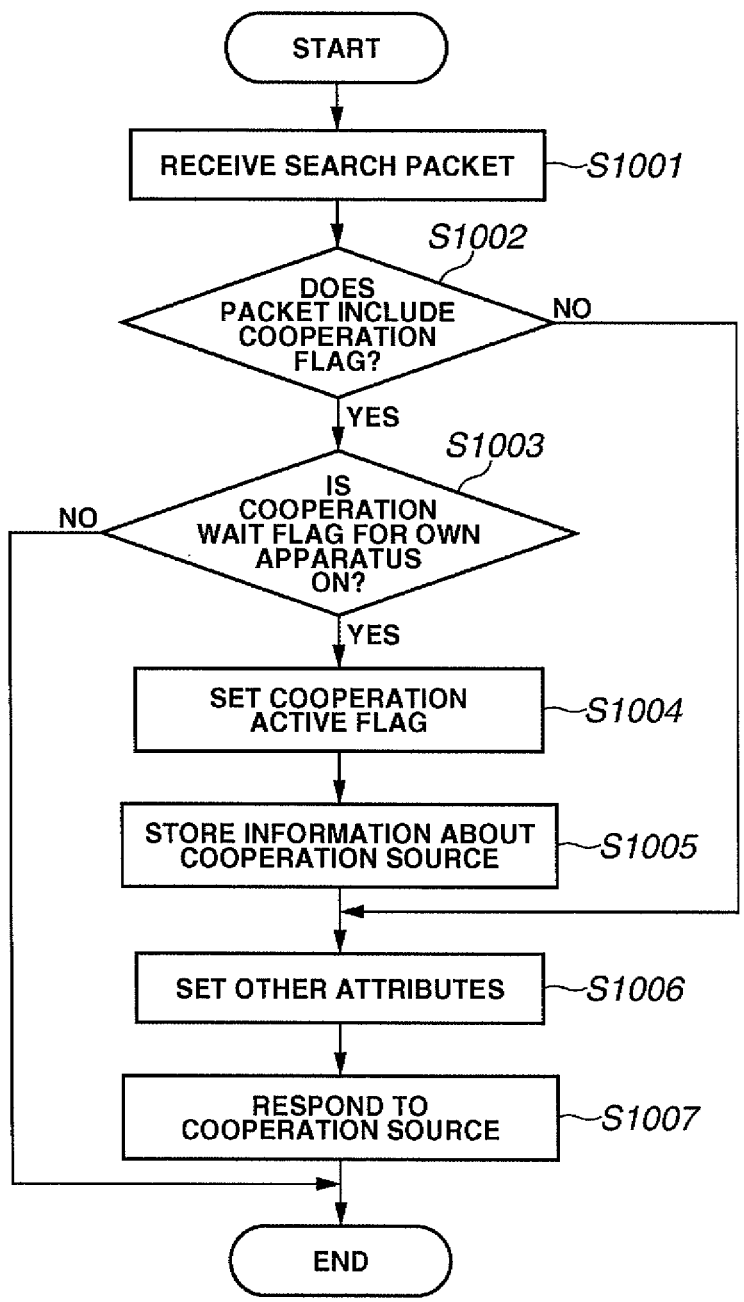
FIG. 10 is a flow chart illustrating exemplary processing performed by an MFP having received the search packet according to the first exemplary embodiment of the present invention.

FIG. 10 is a flow chart illustrating exemplary processing performed by the MFPs 2 through 4, each having received the search packet according to the present embodiment.

Referring to FIG. 10, in step S1001, the CPU 22 of the MFPs 2 through 4 receives a search packet issued from the cooperation source MFP 1.

In step S1002, the CPU 22 checks whether the cooperation wait flag 903 has been set in the received search packet.

If it is determined in step S1002 that the cooperation wait flag 903 has been set in the received search packet (YES in step S1002), then the process advances to step S1003. On the other hand, if it is determined in step S1002 that the cooperation wait flag 903 has not been set in the received search packet (NO in step S1002), then the CPU 22 advances to step S1006.

In step S1003, the CPU 22 checks whether the cooperation wait flag stored on the HDD 29 of the MFP 2 describes the cooperation wait setting state (whether the cooperation wait flag stored on the HDD 29 of each of the MFPs 2 through 4 is set to "True" (FIG. 6)).

If it is determined in step S1003 that the cooperation wait flag stored on the HDD 29 of the MFP 2 is set to "False" (FIG. 6) (NO in step S1003), then the CPU 22 of the MFP 2 determines that the MFP 2 is not in a cooperation wait state and thus the processing ends. On the other hand, if it is determined in step S1003 that the cooperation wait flag stored on the HDD 29 of the MFP 2 is set to "True" (FIG. 6) (YES in step S1003), then the process advances to step S1004.

In the above-described exemplary embodiment, in the case where the cooperation destination apparatus is the MFP 2, the CPU 22 of the MFP 2 advances from step S1003 to step S1004.

Figures 11, 12:
FIG. 11 illustrates an exemplary data structure of a response packet sent from one MFP to another MFP according to the first exemplary embodiment of the present invention.
FIG. 12 illustrates an example of an apparatus selection screen displayed in step S705 of FIG. 10 according to the first exemplary embodiment of the present invention.

FIG. 11 illustrates an exemplary data structure of the response packet 11 sent from the cooperation destination MFP 2 to the cooperation source MFP 1 according to the present embodiment. The response packet 11 includes cooperation destination apparatus name 110, which is information about a cooperation destination MFP. In the example in FIG. 11, "device #1", which is the name of the cooperation destination MFP 2, is set.

A service attribute 111 is held by the cooperation destination MFP 2. In the example in FIG. 11, "print" is set for the service attribute 111. A cooperation active flag state 112 indicates a state of a cooperation active flag for the cooperation destination MFP 2. In the example in FIG. 11, "True", which indicates that cooperation has been established, is set. The cooperation active flag state 112 is set in step S1004 in the flow chart of FIG. 10.

Installation location information 113 describes an installation location of the cooperation destination MFP 2. The installation location information 113 can be used as a determination reference in designating the MFP 2 as a cooperation destination MFP, in the case where, as a result of searching, a large number of MFPs are listed as cooperation destination candidate apparatuses.

Returning to FIG. 10, in step S1004, the CPU 22 sets the cooperation active flag state 112 to "True". Thus, the cooperation destination MFP 2 can notify to the cooperation source MFP 1 that the cooperation destination MFP 2 has been previously set to a cooperation wait state by the user 6 and that the cooperation destination MFP 2 has been designated as a cooperation destination MFP from among apparatuses listed in the search result.

In step S1005, the CPU 22 of the cooperation destination MFP 2 holds device information about the cooperation source MFP 1, such as an IP address. The device information about the cooperation source MFP 1 is used in identifying a cooperation source apparatus to perform cooperation processing only when the operation from a cooperation source apparatus is performed. More specifically, the device information about the cooperation source MFP 1 is used in automatically canceling the once-set cooperation wait state by resetting the set cooperation wait flag after a cooperation operation (described below with reference to FIG. 15) is completed.

In step S1006, the CPU 22 sets another attribute for the response packet 11. More specifically, the CPU 22 sets on information describing an installation location of the cooperation destination MFP 2 as the installation location information 113. In addition, with respect to the service attribute 111, the CPU 22 sets a service function that the cooperation destination MFP 2 can provide, because the search packet does not include a service attribute.

In step S1007, the CPU 22 sends the generated response packet 11 to the cooperation source MFP 1.

When the response packet 11 is sent from the cooperation destination MFP 2 to the cooperation source MFP 1, the processing by the cooperation source MFP 1 advances to step S705 of FIG. 7. In step S705, the CPU 22 displays the search result on the display unit of the operation unit 25 according to the response packet 11 received in step S704.

FIG. 12 illustrates an example of an apparatus selection screen displayed in step S705 of FIG. 7 according to the present embodiment. In the example illustrated in FIG. 12, information about the searched MFP 2 is displayed. The information about the MFP 2 includes a content corresponding to the response packet 11 (FIG. 11).

Returning to FIG. 7, in step S706, the user 6 selects cooperation destination MFP via the operation unit 25. When the cooperation destination MFP is finally designated by the user 6, the processing advances to step S707. In step S707, cooperation processing with the cooperation destination MFP 2 starts.

Figure 13:
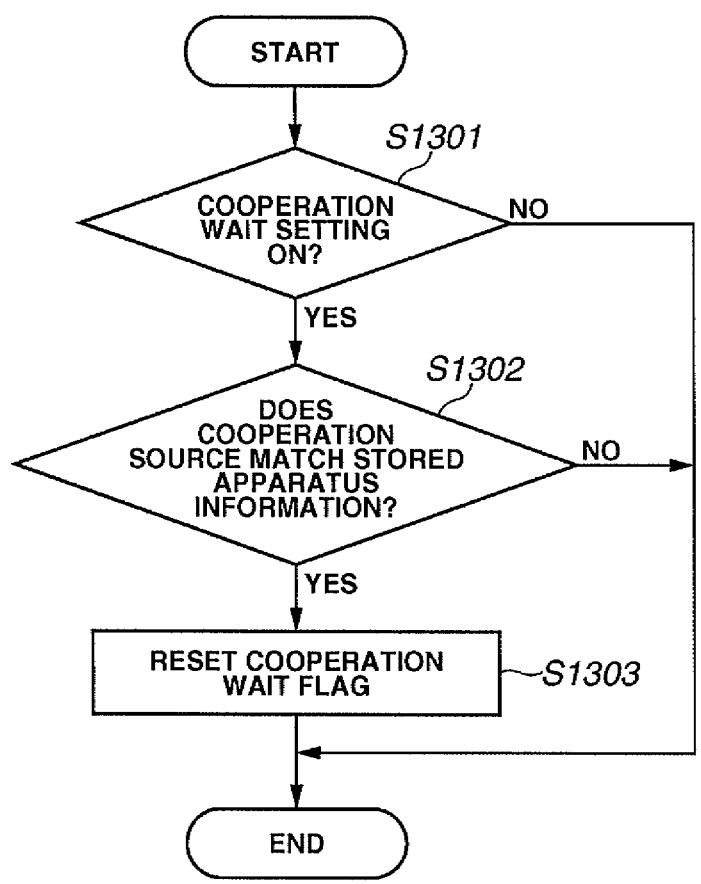
FIG. 13 is a flow chart illustrating exemplary processing performed when a cooperation operation on the cooperation destination MFP is completed, according to the first exemplary embodiment of the present invention.

FIG. 13 is a flow chart illustrating exemplary processing performed when a cooperation operation on the cooperation destination MFP 2 is completed, according to the present embodiment. With the processing in the flow chart of FIG. 13, the cooperation wait state of the cooperation destination MFP 2 can be cancelled. The processing in the flow chart of FIG. 13 starts when a cooperation operation on the cooperation destination MFP 2 is completed.

Referring to FIG. 13, in step S1301, the CPU 22 of the cooperation destination MFP 2 checks for cooperation wait active status of the current cooperation destination MFP 2 (FIG. 6). If it is determined in step S1301 that the cooperation destination MFP 2 is in a cooperation wait state ("True") (YES in step S1301), then the flow advances to step S1302. On the other hand, if it is determined in step S1301 that the cooperation destination MFP 2 is not in a cooperation wait state ("False") (NO in step S1301), then the processing ends.

In step S1302, the CPU 22 checks whether device information about the MFP 1, which is the cooperation source apparatus in the current cooperation operation, matches the device information about the cooperation source apparatus stored in step S1005 (FIG. 10).

If it is determined in step S1302 that the device information about the cooperation source MFP 1 matches the device information about the cooperation source apparatus stored in step S1005 (FIG. 10) (YES in step S1302), then the process advances to step S1303. In step S1303, the CPU 22 sets the cooperation wait flag (FIG. 6) to "False". On the other hand, if it is determined in step S1302 that the device information about the cooperation source MFP 1 does not match the device information about the cooperation source apparatus stored in step S1005 (FIG. 10) (NO in step S1302), then the processing ends.

Thus, in the above-described example, when the processing for cooperating the cooperation destination MFP 2 with the cooperation source MFP 1 is completed, the cooperation wait flag for the cooperation destination MFP 2 is set to "False".

Figure 14:
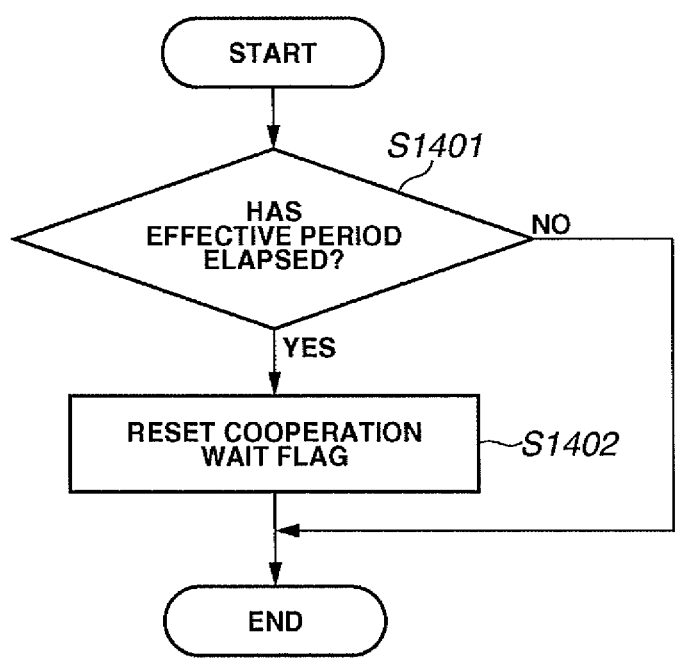
FIG. 14 is a flow chart illustrating exemplary processing for resetting an automatic cooperation wait flag performed by a cooperation destination MFP according to the first exemplary embodiment of the present invention.

FIG. 14 is a flow chart illustrating exemplary processing for resetting an automatic cooperation wait flag performed by the cooperation destination MFP 2 according to the present embodiment. With the processing illustrated in the flow chart of FIG. 14, the cooperation wait flag whose effective period has elapsed is reset after the following steps are periodically performed.

Referring to FIG. 14, in step S1401, the CPU 22 of the cooperation destination MFP 2 checks whether the effective period of the cooperation wait flag (FIG. 6) has elapsed.

If it is determined in step S1401 that the effective period of the cooperation wait flag (FIG. 6) has not elapsed (NO in step S1401), then the processing ends. On the other hand, if it is determined in step S1401 that the effective period of the cooperation wait flag (FIG. 6) has elapsed (YES in step S1401), then the process advances to step S1402. In step S1402, the CPU 22 changes the cooperation wait setting status information from "True" to "False" to reset the cooperation wait flag.

As described above, according to the present embodiment, the cooperation destination MFP 2 is previously set in a cooperation wait state, and after that, the cooperation destination MFP 2 is searched for from the cooperation source MFP 1 to establish a cooperation between the cooperation source MFP 1 and the cooperation destination MFP 2. Thus, the cooperation source MFP 1 and the cooperation destination MFP 2 can perform cooperation processing.

A second exemplary embodiment of the present invention will now be described. In the above-described first exemplary embodiment, whether the cooperation destination MFP 2 is in a cooperation wait state is simply set.

In the present embodiment, the user 6 enters a personal identification number in the cooperation destination MFP 2, and the entered personal identification number is used in searching for an MFP in a cooperation wait state. The configuration of the MFP according to the present embodiment is similar to the configuration described in the previous embodiment. Accordingly, only the differences between the present embodiment and the previous embodiment will be described herein.

Figure 15:
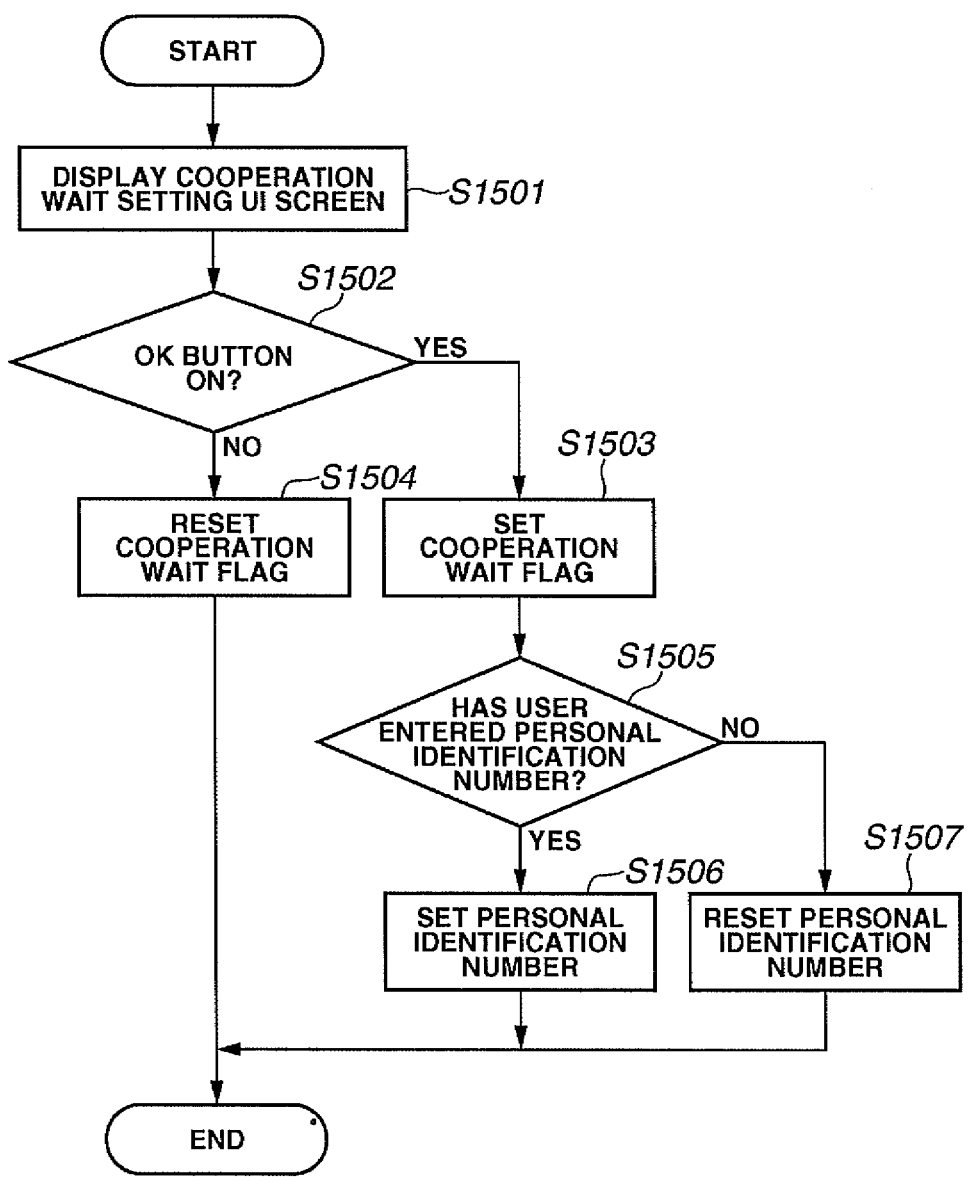
FIG. 15 is a flow chart illustrating exemplary processing for performing a cooperation wait setting performed on a cooperation destination MFP according to a second exemplary embodiment of the present invention.
Figures 16, 17:
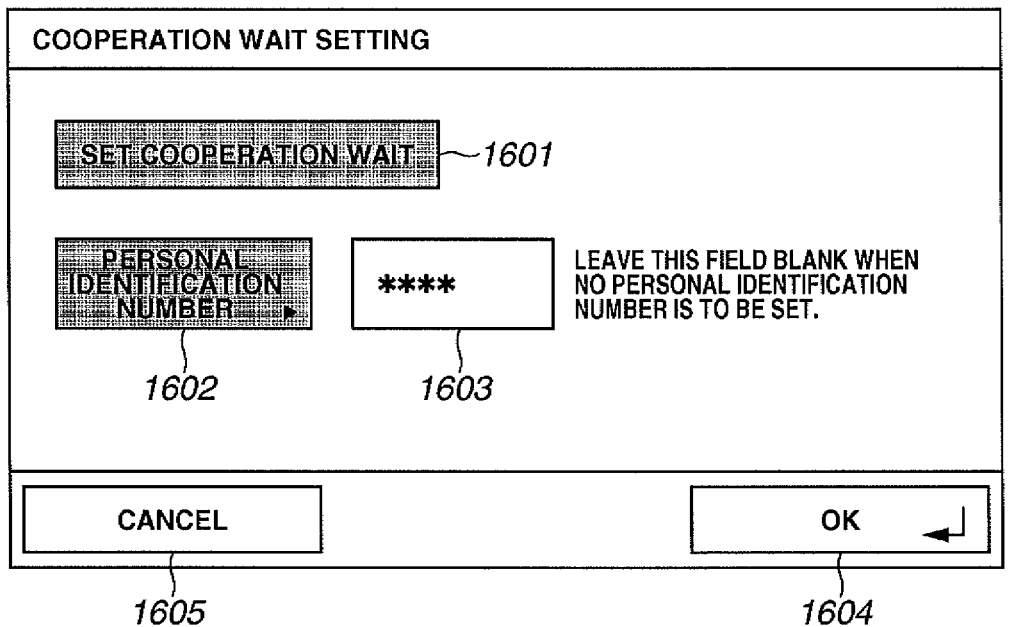
FIG. 16 illustrates an example of a UI screen for performing a cooperation wait setting on a cooperation destination MFP according to the second exemplary embodiment of the present invention.
FIG. 17 illustrates an example of a cooperation wait flag according to the second exemplary embodiment of the present invention.

FIG. 15 is a flow chart illustrating exemplary processing for performing a cooperation wait setting on the cooperation destination MFP 2 according to the present embodiment. FIG. 16 illustrates an example of a UI screen for performing a cooperation wait setting on the cooperation destination MFP 2 according to the present embodiment. The UI screen illustrated in FIG. 16 corresponds to the cooperation wait setting UI screen (FIG. 5).

Referring to FIG. 15, in step S1501, the CPU 22 of the cooperation destination MFP 2 displays a UI screen for performing a cooperation wait setting on the display unit of the operation unit 25.

Referring to FIG. 16, a cooperation wait state instruction button 1601 is used to perform a cooperation wait setting, which corresponds to the UI screen displayed in step S1501 in the flow chart of FIG. 15. A button 1602 is used to issue an instruction for entering the personal identification number when a cooperation wait state is set for the cooperation destination MFP 2. A field 1603 is a field for entering the personal identification number therein.

A cancel button 1605 is used to issue an instruction for canceling the currently set setting. An OK button 1604 is used to issue an instruction for finalizing the settings with the content of the settings set via the UI screen. In the example illustrated in FIG. 16, the cooperation destination MFP 2 is set to be in a cooperation wait state, and a personal identification number has been set. In the example illustrated in FIG. 16, four-digit numerical number is entered.

Returning to FIG. 15, in step S1502, the user 6 sets a cooperation wait state via the UI screen in FIG. 16. In addition, in step S1502, the CPU 22 determines whether the user 6 has pressed the OK button 1604. If it is determined in step S1502 that the user 6 has pressed the OK button 1604 (YES in step S1502), then the process advances to step S1503.

On the other hand, if it is determined in step S1502 that the user 6 has pressed the cancel button 1605 (NO in step S1502), then the process advances to step S1504. In step S1504, the CPU 22 resets the cooperation wait flag, and then the processing ends.

In step S1503, the CPU 22 sets the cooperation wait flag ("True"). In step S1505, the CPU 22 determines whether the user 6 has entered a personal identification number via the UI screen (FIG. 16).

If it is determined in step S1505 that the user 6 has not entered a personal identification number via the UI screen (FIG. 16) (NO in step S1505), then the process to step S1507. In step S1507, the CPU 22 resets the personal identification number.

On the other hand, if it is determined in step S1505 that the user 6 has entered a personal identification number via the UI screen (FIG. 16) (YES in step S1505), then the process advances to step S1506. In step S1506, the CPU 22 sets a personal identification number for cooperation wait setting illustrated in FIG. 17.

FIG. 17 illustrates an example of a cooperation wait flag according to the present embodiment. The cooperation wait flag corresponds to and has the same date structure as the cooperation wait flag illustrated in FIG. 6. In the present embodiment, a field for setting a personal identification number for cooperation wait setting is added to the data structure of the cooperation wait flag.

In the present embodiment, a numerical value is used as the personal identification number. However, the personal identification number can be described by characters or symbols, in addition to numerical values, in order to increase a degree of uniqueness of the personal identification number. In addition, the number of digits or characters of the personal identification number is not limited to four.

Figure 18:
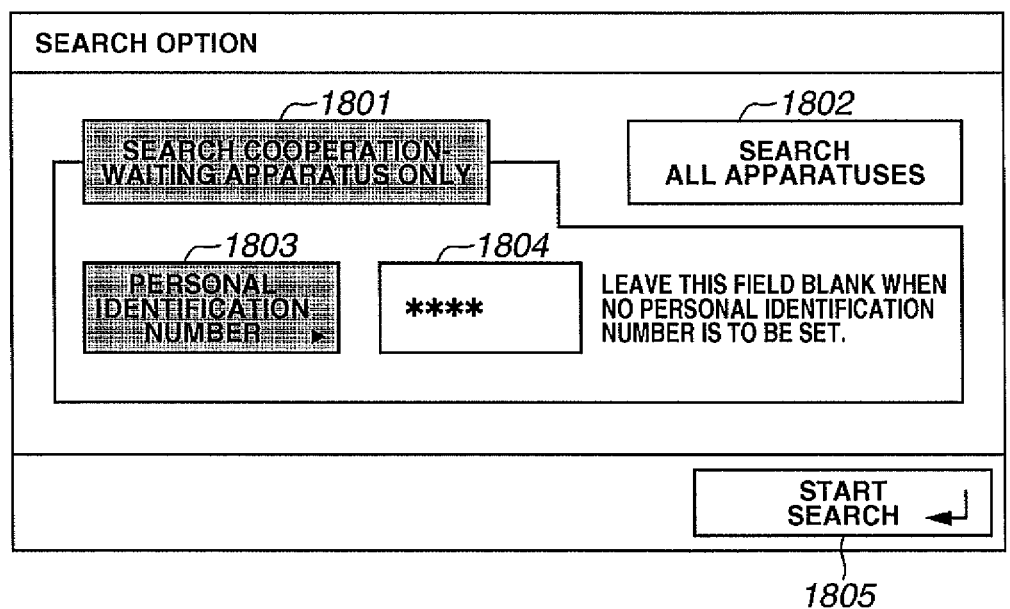
FIG. 18 illustrates an example of a UI screen for issuing a search instruction according to the second exemplary embodiment of the present invention.

FIG. 18 illustrates an example of a UI screen for issuing a search instruction according to the present embodiment.

Referring to FIG. 18, a button 1801 is used to issue an instruction for searching only for an apparatus in a cooperation wait state. A button 1802 is used to issue an instruction for searching for all the apparatuses connected on the network 5. Buttons 1801 and 1802 correspond to buttons 801 and 802 (FIG. 8) respectively.

A button 1803 is used to issue an instruction for designating whether the personal identification number for identifying an MFP in cooperation wait state, which is an apparatus search object, is to be entered. An entry field 1804 is a field for entering the personal identification number therein. In the case where only the apparatus in a cooperation wait state is to be searched, the user 6 presses the button 1801 before pressing the button 1803 that designates a search for the personal identification number.

Then, the user 6 enters the personal identification number entered via the cooperation destination MFP in step S1506 in FIG. 15, in the personal identification number entry field 1804. Then, the user 6 presses the search button 1805. Thus, the user can search for a cooperation destination MFP that is set in the cooperation wait state and corresponds to the personal identification number that is a search key.

The operation performed after the user 6 presses the start search button 1805 on the UI screen in FIG. 18 is the same as the operations performed according to the processing in the flow chart of FIG. 7. Accordingly, the description thereof is not repeated here. One difference between the present embodiment and the previous embodiment is that in step S703 of FIG. 7, the user 6 enters the personal identification number entered via the cooperation destination MFP in step S1506 of FIG. 15.

Figure 19:
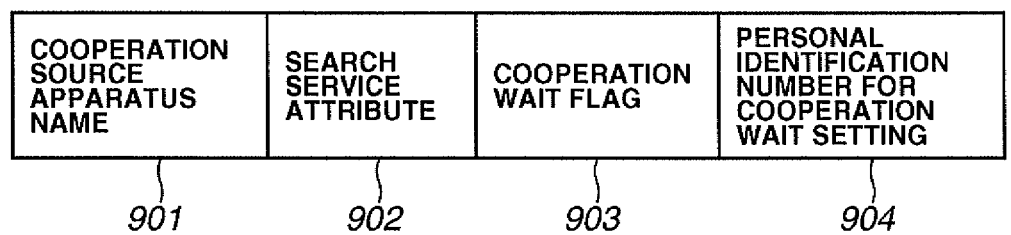
FIG. 19 illustrates an example of a search packet according to the second exemplary embodiment of the present invention.

FIG. 19 illustrates an example of a search packet according to the present embodiment. In the example illustrated in FIG. 19, a personal identification number for cooperation wait setting field 904 is added to the data structure of the search packet according to the previous embodiment (FIG. 9). The personal identification number is entered in step S703 in FIG. 7.

The processing by the MFPs 2 through 4, which respectively are a cooperation destination MFP in the case of the search according to the present embodiment, is the same as the processing performed according to the flow chart of FIG. 10. Accordingly, the description thereof is not repeated here.

However, in the present embodiment, the personal identification number for cooperation wait setting field 904 that is included in the search packet according to the present embodiment, is collated with the personal identification number in the cooperation wait flag that has been set to the MFP in step S1003 in FIG. 10, together with the cooperation wait flag.

Returning to FIG. 10, when the cooperation wait flag is set to "True" and the entered personal identification number matches the personal identification number in the cooperation wait flag set to the MFP, the process advances to step S1004. The processing other than the above-described processing is the same as that in the previous embodiment. Accordingly, the description thereof will not be repeated here.

As described above, according to the present embodiment, in addition to the effect of the previous embodiment, a cooperation destination apparatus can be more surely identified by using the personal identification number. Thus, cooperation processing can be performed with the cooperation source apparatus and the cooperation destination apparatus.

A third exemplary embodiment of the present invention will now be described. In the above-described second exemplary embodiment, with respect to the cooperation destination MFP, even when a plurality of users have set the cooperation destination MFP in a cooperation wait state at the same time, a desired cooperation destination MFP can be identified using the personal identification number entered by the user 6.

In the present embodiment, authentication information for identifying the user 6 is used in the search on the cooperation destination MFP. Note that the configuration of the MFP according to the present embodiment is the same as the MFP in the first exemplary embodiment. Accordingly, the description thereof will not be repeated here, and only any differences will be described.

Figure 20:
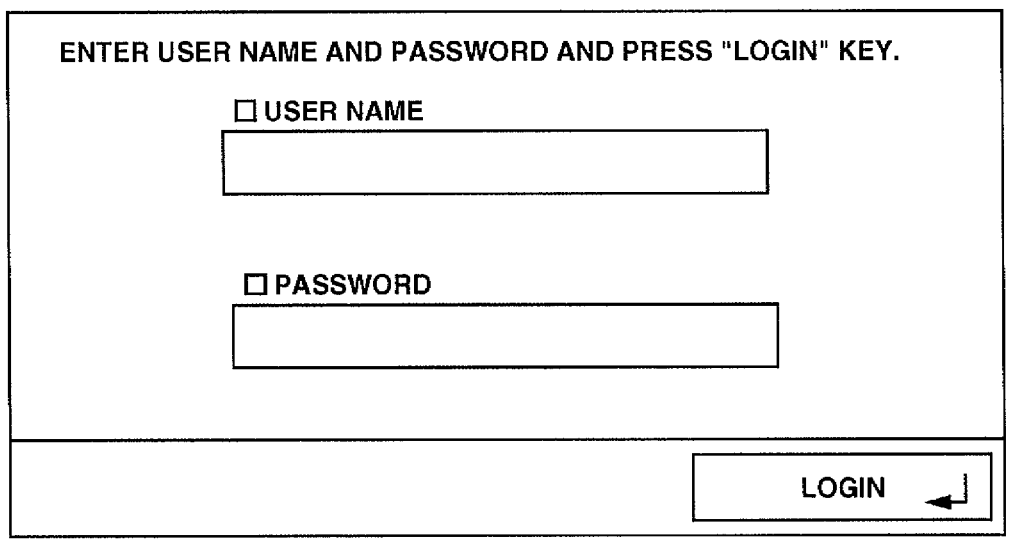
FIG. 20 illustrates an example of a login screen for logging in to the MFP according to a third exemplary embodiment of the present invention.

FIG. 20 illustrates an example of a login screen for logging in to the MFP according to the present embodiment. In the example illustrated in FIG. 20, the user 6 logs in to the MFP by entering the name of the user 6 and a password (hereinafter collectively referred to as "authentication information"). The user 6 enters the authentication information via a touch panel (display unit) of the operation unit 25. Alternatively, the user 6 can enter the authentication information using an IC card.

Figure 21:
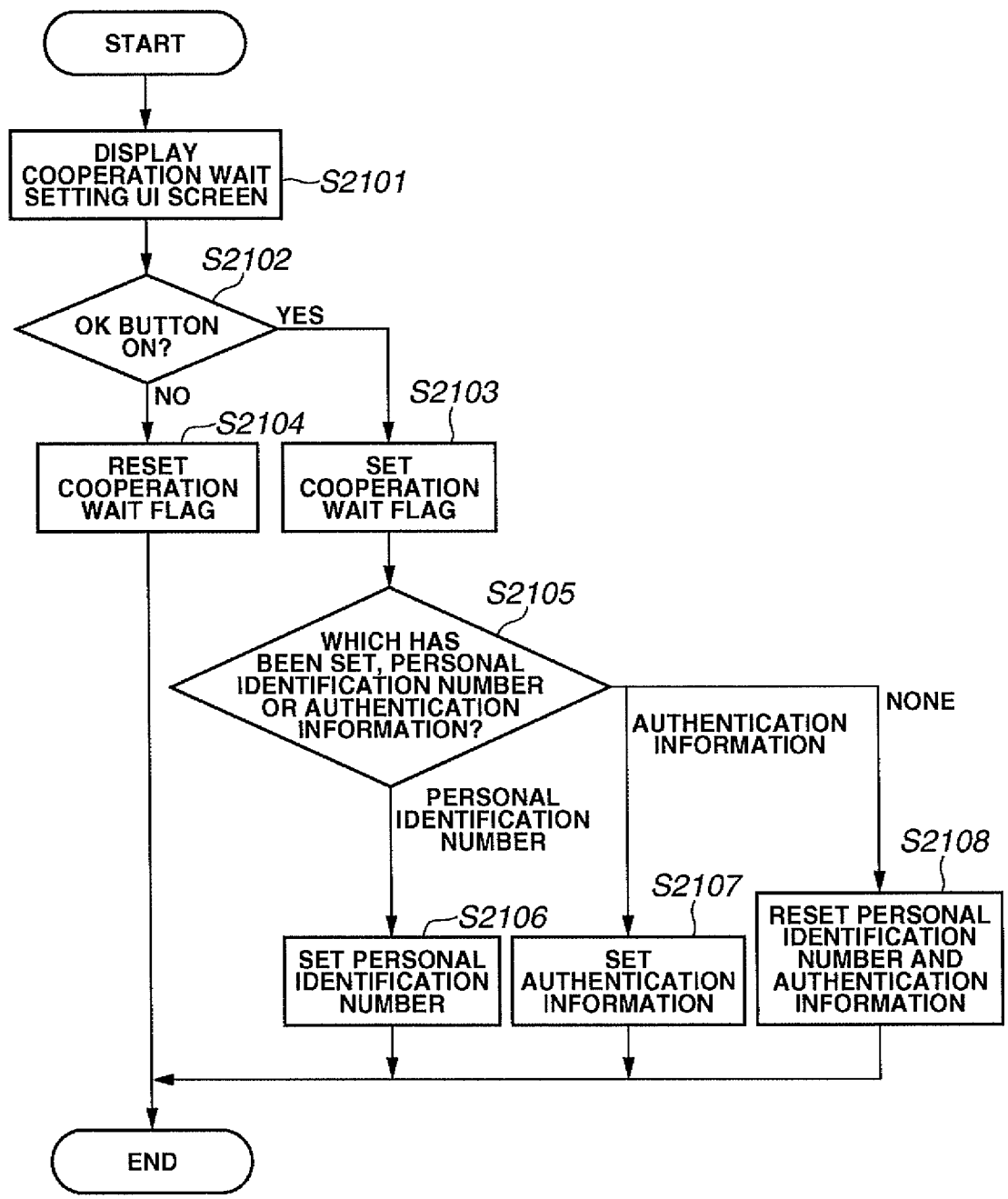
FIG. 21 is a flow chart illustrating exemplary processing performed by a cooperation destination MFP according to the third exemplary embodiment of the present invention.
Figures 22, 23:
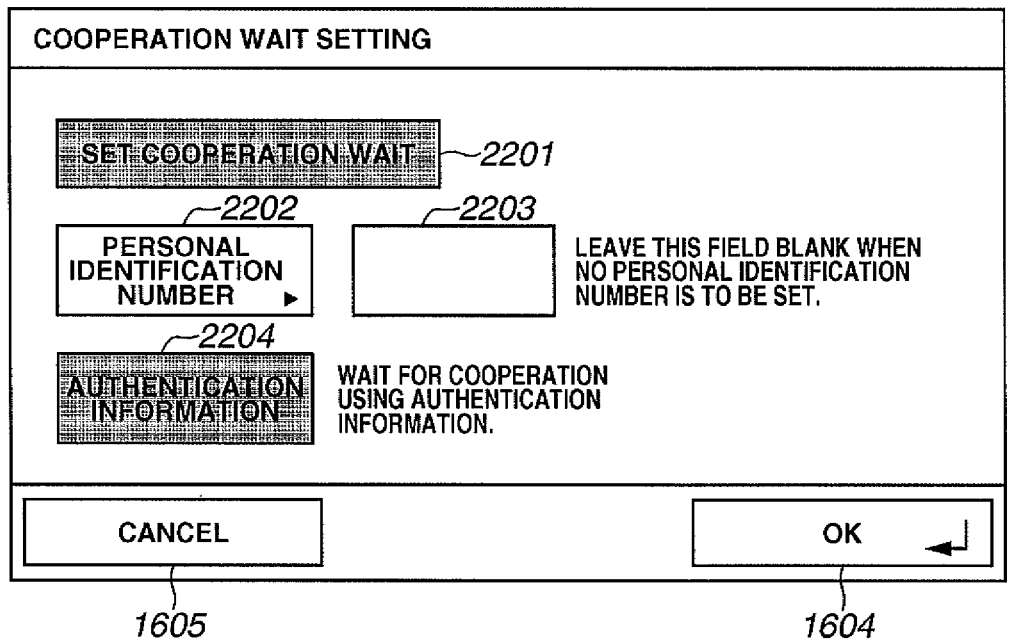
FIG. 22 illustrates an example of a screen for performing a cooperation wait setting on a cooperation destination MFP according to the third exemplary embodiment of the present invention.
FIG. 23 illustrates an example of a data structure of a cooperation wait flag according to the third exemplary embodiment of the present invention.

FIG. 21 is a flow chart illustrating exemplary processing performed by the cooperation destination MFP 2 according to the present embodiment. FIG. 22 illustrates an example of a screen for performing a cooperation wait setting on the cooperation destination MFP 2 according to the present embodiment. The screen illustrated in FIG. 22 corresponds to the cooperation wait setting UI screen in FIG. 16.

Referring to FIG. 21, in step S2101, the CPU 22 of the cooperation destination MFP 2 displays a UI screen for issuing an instruction for setting a cooperation wait on the operation unit 25.

FIG. 22 illustrates an example of a cooperation wait setting instruction screen, which corresponds to the UI screen displayed in step S2101 in FIG. 21, via which the user 6 issues an instruction for setting a cooperation wait state. In the example in FIG. 22, a cooperation wait state instruction button 2201, a personal identification number setting button 2202, and a personal identification number entry field 2203 are provided, similar to those in the second exemplary embodiment. Using the cooperation wait state instruction button 2201, the personal identification number setting button 2202, and the personal identification number entry field 2203, the user 6 can set a personal identification number for setting a cooperation operation.

When the user 6 presses the authentication information setting button 2204, the user 6 can add the authentication information used for logging in to the MFP illustrated in FIG. 20 as the search key for searching for an apparatus in a cooperation wait state.

FIG. 22 illustrates a screen displayed in the case of searching for an apparatus in a cooperation wait state using the authentication information instead of the personal identification number.

Returning to FIG. 21, in step S2102, the CPU 22 determines whether the user 6 has pressed the OK button 1604. If it is determined in step S2102 that the user 6 has pressed the OK button 1604 (YES in step S2102), then the process advances to step S2103. In step S2103, the CPU 22 starts the processing for setting the cooperation wait flag.

On the other hand, if it is determined in step S2102 that the user 6 has pressed the cancel button 1605 (NO in step S2102), then the process advances to step S2104. In step S2104, the CPU 22 resets the cooperation wait flag and then the processing ends.

After step S2103, the process advances to step S2105. In step S2105, the CPU 22 advances to the processing corresponding to the user operation performed via the UI screen in FIG. 22. More specifically, in step S2105, the CPU 22 determines which identification method (the personal identification number or the authentication information) has been used. If it is determined in step S2105 that the user 6 has instructed the search according to the personal identification number by pressing the personal identification number setting button 2202, then the process advances to step S2106. In step S2106, the CPU 22 sets the personal identification number, as in step S1506 in FIG. 15.

FIG. 23 illustrates an example of a data structure of a cooperation wait flag according to the present embodiment. In the example illustrated in FIG. 23, authentication information for setting a cooperation wait state is added to the data structure illustrated in FIG. 17. Here, no personal identification number is set as described with reference to FIG. 22. Accordingly, "NULL" is set for the personal identification number for setting a cooperation wait state.

Returning to FIG. 21, if it is determined in step S2105 that authentication information has been set as the search key, then the process advances to step S2107. In step S2107, the CPU 22 sets the authentication information entered by the user 6 via the login screen in FIG. 20 (in this example, the name of the user 6) as the authentication information for setting a cooperation wait state (FIG. 23).

On the other hand, if it is determined in step S2105 that the user 6 has not pressed the personal identification number setting button 2202 or the authentication information setting button 2204, the process advances to step S2108. In step S2108, the CPU 22 resets the personal identification number and the authentication information in FIG. 23.

The data structure of the cooperation wait flag illustrated in FIG. 23 corresponds to the data structure of the cooperation wait flag illustrated in FIG. 17. The data structure of the cooperation wait flag in the present embodiment includes a field for entering the authentication information for setting a cooperation wait state, in addition to the data structure of the cooperation wait flag illustrated in FIG. 17. In the example of the cooperation wait flag in FIG. 23, the name of the user 6 is used as the authentication information.

However, the authentication information is not limited to the name of the user 6. Any information for identifying each user 6 can be used for the authentication information, such as a password or an identification (ID) number allocated to each IC card. Note that the user 6 issues an instruction for starting cooperation processing after the user 6 has performed an operation for user authentication via the login screen (FIG. 20) also on the cooperation source MFP 1.

FIG. 24 illustrates an example of a UI screen for designating an option for a search performed on the cooperation source MFP 1 according to the present embodiment. The UI screen in FIG. 24 has the configuration similar to that in FIG. 18. In addition to this, the user 6 can issue an instruction for performing a search using the authentication information.

Referring to FIG. 24, the button 1801, the button 1802, the button 1803, and the entry field 1804 are the same as those in FIG. 18. Accordingly, the description thereof will not be repeated here.

When the user 6 presses the authentication information setting button 2405, the search using the authentication information is instructed. When the user 6 presses the start search button 1805 in this state, the search for a cooperation destination MFP using the authentication information as the search key, starts.

The search processing according to the present embodiment is essentially the same as the search processing described in the flow chart of FIG. 7.

However, in step S703 in FIG. 7, the user 6 issues an instruction for designating in the search packet as to whether to search for an apparatus in a cooperation wait state only and sets the personal identification number and the authentication information, which is different from the present embodiment.

FIG. 25 illustrates an example of a data structure of a search packet according to the present embodiment.

In the example illustrated in FIG. 25, an entry field 905 for setting the authentication information for setting a cooperation wait state is added to the data structure of the search packet illustrated in FIG. 19. As described above, the authentication information for setting a cooperation wait state is set in the search packet in step S703 in FIG. 7. Furthermore, the processing for responding to the search operation by the cooperation destination MFPs 2 through 4 performed during a search is essentially the same as the processing in the flow chart of FIG. 10.

However, in step S1003 in FIG. 10, the CPU 22 performs a collation processing according to the cooperation wait flag included in the search packet, the personal identification number, and the authentication information, which is different from the present embodiment.

According to the present embodiment, the authentication information, such as the name of the user 6, which is entered when the user 6 logs in to the MFP, can be used as identification information for identifying the cooperation destination apparatus. Accordingly, even in the case where a plurality of apparatuses can be a cooperation destination candidate apparatus, the user 6 can more surely select a desired apparatus to perform cooperation processing between the cooperation source apparatus and the designated cooperation destination apparatus.

According to the above-described exemplary embodiment, even in the case where a plurality of apparatuses can be a cooperation destination candidate apparatus, the user 6 can easily perform cooperation processing between the cooperation source apparatus and the designated cooperation destination apparatus.

The present invention can be applied to a system including a plurality of devices (for example, a computer, an interface device, a reader, a printer, a file server) and to an apparatus that includes one device (for example, a network MFP). Moreover, the present invention can be implemented by directly or remotely supplying a program of software implementing functions of the above-described exemplary embodiments (in the exemplary embodiments, the program corresponding to the processing performed according to the flow charts in the drawings) to a system or an apparatus and reading and executing supplied program codes with the system or a computer of the apparatus.

In this case, the program can be configured in any form other than a program. Accordingly, the program code itself, which is installed to the computer for implementing the functional processing of the present invention with the computer, implements the present invention. That is, the present invention also includes the computer program implementing the functional processing of the present invention.

In this case, the program can be configured in any form, such as object code, a program executed by an interpreter, and script data supplied to an OS.

As the recording medium for supplying such program code, a floppy disk, a hard disk, an optical disk, a magneto-optical disk (MO), a compact disk-read only memory (CD-ROM), a CD-recordable (CD-R), a CD-rewritable (CD-RW), a magnetic tape, a nonvolatile memory card, a ROM, and a digital versatile disk (DVD) (a DVD-read only memory (DVD-ROM) and a DVD-recordable (DVD-R)), for example, can be used.

The above program can also be supplied by connecting to a web site on the Internet by using a browser of a client computer and by downloading the program from the web site to a recording medium such as a hard disk. In addition, the above program can also be supplied by downloading a compressed file that includes an automatic installation function from the web site to a recording medium such as a hard disk. The functions of the above embodiments can also be implemented by dividing the program code into a plurality of files and downloading each divided file from different web sites. That is, a WWW server for allowing a plurality of users to download the program file for implementing the functional processing constitutes the present invention.

In addition, the above program can also be supplied by distributing a storage medium such as a CD-ROM and the like which stores the program according to the present invention after an encryption thereof; by allowing the user who is qualified for a prescribed condition to download key information for decoding the encryption from the web site via the Internet; and by executing and installing in the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Further, in another aspect of the embodiment of the present invention, after the program code read from the recording medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation to encompass all modifications, equivalent structures, and functions.

This application claims priority from Japanese Patent Application No. 2006-273418 filed Oct. 4, 2006, which is hereby incorporated by reference herein in its entirety.

What is claimed is:

1. A system configured to perform cooperation processing with a first apparatus and a second apparatus among a plurality of apparatuses, the system comprising:
the first apparatus, which comprises:
an instruction receiving unit configured to receive, from a user, an instruction to set the first apparatus in a cooperation wait state,
a setting unit configured to set the first apparatus in the cooperation wait state in accordance with the instruction received by the instruction receiving unit, and
a response unit configured to send, when the first apparatus is in the cooperation wait state, response data to indicate that the first apparatus is in the cooperation wait state, in accordance with search data designating an apparatus being in the cooperation wait state; and
the second apparatus, which comprises:
a searching unit configured to issue the search data designating an apparatus being in the cooperation wait state, and receive the response data from the first apparatus being in the cooperation wait state,
a display unit configured to display a result of search by the searching unit based on the received response data from the first apparatus being in the cooperation wait state, and
a control unit configured to control the second apparatus to cooperate with the first apparatus which is designated as a cooperation destination by the user from among the result of search displayed by the display unit.

2. The system according to claim 1, wherein the setting unit is configured to set an effective period of the cooperation wait state and to cancel the cooperation wait state in response to the effective period being elapsed.

3. The system according to claim 1, wherein the first apparatus is configured to cancel the cooperation wait state after the cooperation processing is completed.

4. The system according to claim 1, wherein the setting unit is configured to set at least identification information for identifying the cooperation wait state, and
wherein the searching unit is configured to search for an apparatus that is in the cooperation wait state and includes the identification information.

5. The system according to claim 1, wherein the setting unit is configured to set authentication information in addition to the cooperation wait state for the first apparatus, and
wherein the searching unit is configured to search for an apparatus that is in the cooperation wait state according to the authentication information.

6. An information processing apparatus configured to perform cooperation processing with another apparatus, the information processing apparatus comprising:
a searching unit configured to issue search data designating an apparatus being in a cooperation wait state, and receive, from an apparatus which has received from a user an instruction to set the apparatus in the cooperation wait state and has been set in the cooperation wait state in accordance with the instruction, response data to indicate that the apparatus is in the cooperation wait state which is sent by the apparatus in accordance with the search data when the apparatus is in the cooperation wait state;
a display unit configured to display a result of search by the searching unit based on the received response data from the apparatus being in the cooperation wait state; and
a processing unit configured to perform cooperation processing between the information processing apparatus and the apparatus which is designated as a cooperation destination by the user from among the result of search displayed by the display unit.

7. The information processing apparatus according to claim 6,
wherein the searching unit is configured to issue, if a first search to search for an apparatus being in the cooperation wait state is instructed, the search data designating the apparatus being in the cooperation wait state, and
wherein the searching unit is configured to issue, if a second search to search for an apparatus which is not limited to the apparatus being in the cooperation wait state is instructed, search data not designating the apparatus being in the cooperation wait state and receive response data sent from the apparatus based on the issued search data.

8. The information processing apparatus according to claim 7, wherein the searching unit is configured to search for an apparatus that is in the cooperation wait state and includes specific identification information.

9. The information processing apparatus according to claim 7, wherein the searching unit is configured to search for the apparatus being in the cooperation wait state according to authentication information.

10. A method for a system configured to perform cooperation processing with a first apparatus and a second apparatus among a plurality of apparatuses, the method comprising:
receiving an instruction to set the first apparatus in a cooperate wait state;
setting the first apparatus in the cooperation wait state in accordance with the instruction;
issuing search data designating an apparatus being in the cooperation wait state from the second apparatus;
sending response data to indicate that the apparatus is in the cooperation wait state, in accordance with the search data from the first apparatus, when the first apparatus is in the cooperation wait state;
displaying, at the second apparatus, a result of the searching based on the sent response data; and
performing image processing with the second apparatus and the first apparatus which is designated as a cooperation destination by the user from among the result of the searching.

11. The method according to claim 10, further comprising: setting an effective period of the cooperation wait state and canceling the cooperation wait state in response to the effective period being elapsed.

12. The method according to claim 10, wherein the cooperation wait state is canceled after the cooperation processing is completed.

13. The method according to claim 10, further comprising:
setting at least identification information for identifying the cooperation wait state,
wherein the searching searches for an apparatus that is in the cooperation wait state and includes the identification information.

14. The method according to claim 10, further comprising:
setting authentication information in addition to the cooperation wait state for the cooperation destination apparatus,
wherein the searching searches for an apparatus that is in the cooperation wait state according to the authentication information.

15. A non-transitory computer-readable storage medium storing a program to cause a computer to perform the method according claim 10.

16. A system configured to perform cooperation processing with a first apparatus and a second apparatus among a plurality of apparatuses, the system comprising:

the first apparatus, which comprises:

an instruction receiving unit configured to receive, from a user, an instruction to set the first apparatus in a cooperation wait state, and a setting unit configured to set the first apparatus in the cooperation wait state in accordance with the instruction received by the instruction receiving unit; and the second apparatus, which comprises:

a searching unit configured to search, if a first search to search for an apparatus being in the cooperation wait state is instructed, for the first apparatus which has received the instruction to set the first apparatus in the cooperation wait state and is in the cooperation wait state without another apparatus which is not in the cooperation wait state, and to search, if a second search to search for an apparatus which is not limited to the apparatus being in the cooperation wait state is instructed, for the first apparatus and the another apparatus which is not in the cooperation wait state, a display unit configured to display a result of search by the searching unit, and a control unit configured to control the second apparatus to cooperate with the first apparatus which is designated as a cooperation destination by the user from among the result of search displayed by the display unit, wherein the searching unit is configured to issue if the first search is instructed, a search packet for designating the apparatus being in the cooperation wait state, and wherein the searching unit is configured to issue, if the second search is instructed, a search packet not designating the apparatus being in the cooperation wait state.

* * * * *